United States Patent [19]

Ehara et al.

[11] Patent Number: 4,851,865
[45] Date of Patent: Jul. 25, 1989

[54] ELECTROPHOTOGRAPHIC APPARATUS

[75] Inventors: Toshiyuki Ehara; Shigenori Ueda, both of Yokohama; Koji Yamazaki, Ebina, all of Japan

[73] Assignee: Canon Kabushiki Kaisha, Tokyo, Japan

[21] Appl. No.: 120,516

[22] Filed: Nov. 13, 1987

[30] Foreign Application Priority Data

Nov. 17, 1986 [JP] Japan .................................. 61-272012

[51] Int. Cl.$^4$ ............................................. G01D 15/00
[52] U.S. Cl. .............................. 346/160.1; 346/153.1
[58] Field of Search ................... 346/160, 160.1, 150, 346/153; 355/30 R, 3 R, 14 R; 358/300

[56] References Cited

U.S. PATENT DOCUMENTS 4,607,936  8/1986  Miyakawa et al. ............... 355/30 R
4,739,350  4/1988  Arao ..................................... 346/160

Primary Examiner—Arthur G. Evans
Attorney, Agent, or Firm—Fitzpatrick, Cella, Harper & Scinto

[57] ABSTRACT

An electrophotographic apparatus includes a movable amorphous silicon photosensitive member, charger for charging the photosensitive member, and a projection device for projecting a laser beam onto said photosensitive member. The projection device projects the beam through said charger. The problem peculiar to the amorphous silicon photosensitive member that the dark decay is stronger can be obviated without deteriorating the advantage of high quality and long life of the amorphous silicon photosensitive member.

22 Claims, 3 Drawing Sheets

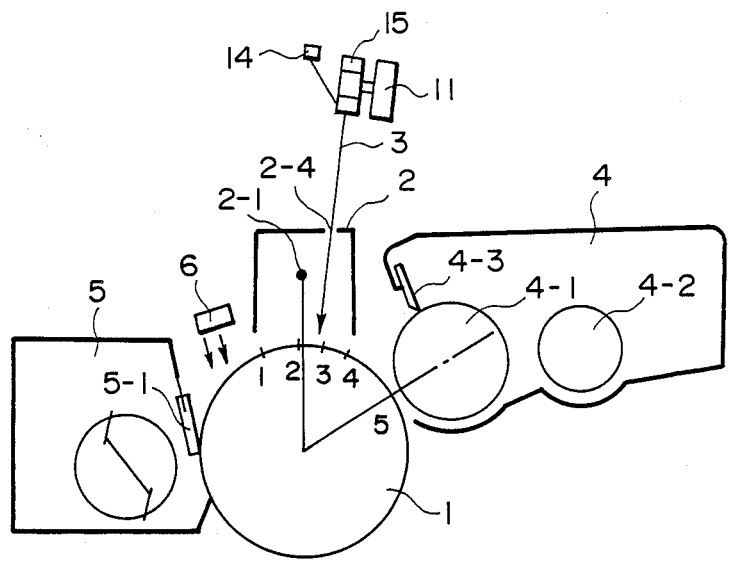
F I G. 1
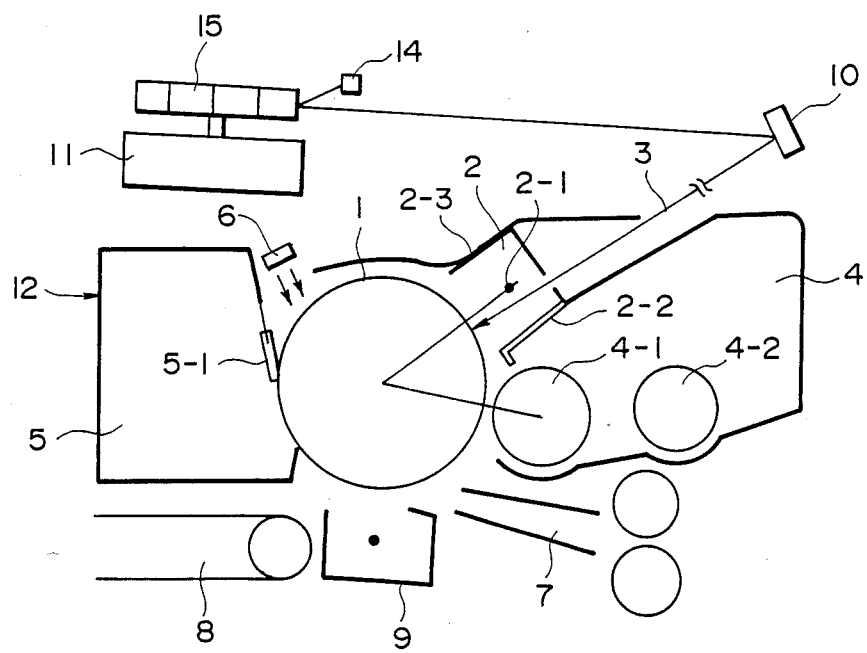
F I G. 2

ELECTROPHOTOGRAPHIC APPARATUS

FIELD OF THE INVENTION AND RELATED ART

The present invention relates to an electrophotographic apparatus wherein an electrostatic latent image is formed on a photosensitive member by electrically charging it and exposing it to light imagewisely. More particularly, it relates to an electrophotographic apparatus wherein the photosensitive member is exposed to a laser beam imagewisely modulated.

As the computers are developed and become widely used, the demand for an electrophotographic apparatus as an output device of the computers is rapidly increased in recent years, because it can produce high image quality prints at a high speed and with low noise. The output electrophotographic apparatus is a laser beam printer or a laser copying machine or the like having multiple functions and performing what is called digital copy, wherein a laser, more particularly, a semiconductor laser producing a laser beam modulated imagewisely is used as a light source.

Referring first to FIG. 4, there is shown a somewhat schematic cross-section of an electrophotographic apparatus including a laser for the light source, wherein around the photosensitive drum 1 rotatable at a constant rotational speed, there are disposed a charger 2, an exposure station at which the photosensitive member 1 is exposed to a laser beam 3 which has been modulated in accordance with an image signal, a developing device 4, a cleaning device 5 and a discharging light source 6 for removing light hysteresis of the photosensitive member. The image forming process of the electrophotographic apparatus is well-known, and therefore, the description thereof will be omitted for the sake of simplicity.

As for the light source in the electrophotographic apparatus wherein a digital recording is effected using a laser beam, a semiconductor laser of a self-modulation type is widely used which is able to produce a laser beam already modulated by an image signal. By employing such a self-modulation type laser, the necessity of using a separate modulator is eliminated, so that the apparatus can be reduced in the size and cost.

Due to various advantages of the apparatus of this type, such as a laser beam printer, it is further desired to further reduce the size and cost thereof.

On the other hand, a new photosensitive material, that is, an amorphous silicon becomes recently used with a high speed copying machine. The amorphous silicon photosensitive member has a high durability, a high surface hardness and a high photosensitivity to a relatively long wavelength range of light.

However, the amorphous silicon photosensitive member, which is usually produced by accumulating silane gas on a metal cylinder, is relatively expensive, and therefore, in order to accomplish the low cost, it is preferable to reduce the diameter of the cylinder so as to reduce the accumulation area.

Generally, the amorphous silicon photosensitive member exhibits a relatively high dark decay (attenuation of the electric potential in the area not illuminated with light). For this reason, in order to provide a high contrast of the image at the time of development, it is desired that the time required from the charging to the development is reduced as much as possible. Additionally, the amorphous silicon photosensitive member has a high dielectric constant, so that the charge retentivity is not very high. So, to increase the charge potential of the amorphous silicon photosensitive member, the thickness of the photosensitive layer is increased. This is effective to increase the charge potential on one hand, but results on the other hand in increase in cost of manufacturing which necessarily leads to expensive apparatus.

SUMMARY OF THE INVENTION

Accordingly, it is a principal object of the present invention to provide an electrophotographic apparatus which is small in size and which effectively utilize the advantages of a laser beam.

It is another object of the present invention to provide an electrophotographic apparatus wherein both of advantages of use of a laser beam and the use of amorphous silicon photosensitive member accrue.

It is a further object of the present invention to provide an electrophotographic apparatus in which a distance between a charging station and a developing station is reduced.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a sectional view of an electrophotographic apparatus according to an embodiment of the present invention.

FIG. 2 is a sectional view of an electrophotographic apparatus according to another embodiment of the present invention.

DESCRIPTION OF THE PREFERRED EMBODIMENTS

Figure 3:
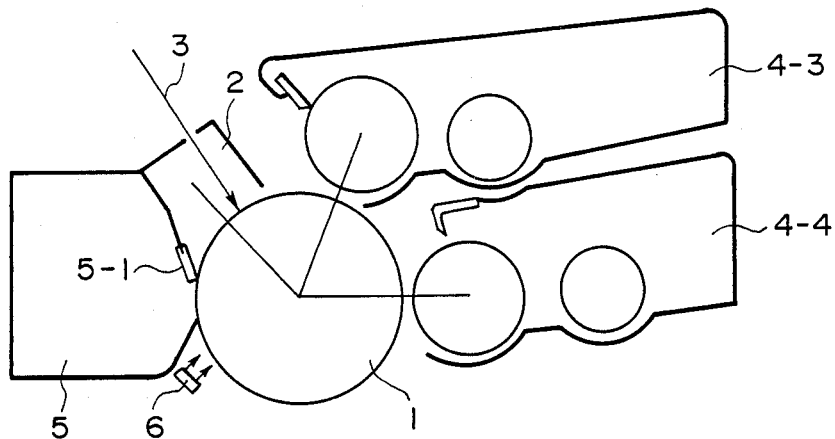
FIG. 3 is a sectional view of an electrophotographic apparatus according to another embodiment of the present invention.

The embodiments of the present invention will be described in conjunction with accompanying drawings wherein the same reference numerals are assigned to the elements having corresponding functions.

Referring now to FIG. 1, there is shown a sectional view of an electrophotographic apparatus according to a first embodiment of the present invention, which comprises an amorphous photosensitive member 1 to be exposed to a laser beam 3, a charger 2, a developing device 4, a cleaner 5 and a discharging light source.

A semi-conductor laser 14 produces a laser beam modulated in accordance with an image to be recorded. The laser beam 3 produced by the semiconductor laser 14 is received by a rotatable mirror 15 driven by a driving motor 11 and is scanningly deflected thereby in a direction of a rotational axis of the photosensitive member 1.

The basic wavelength of the laser beam produced by the semiconductor laser 14 is 780 nm in this embodiment. The basic oscillation wavelength of a semiconductor laser used with laser beam printers generally ranges from 770–790 nm. Since an amorphous silicon photosensitive member exhibits high sensitivity in a long wavelength range, it matches the semiconductor laser beam well.

The charger 2 includes a discharging wire 2-1 and a shielding member for enclosing three sides of the discharging wire 2-1 as shown in FIG. 1. A slit 2-4 is formed in a rear side of the shielding member, that is, at the opposite side of the discharging wire 2-1 from the photosensitive member 1. Through the slit 2-4, the laser beam 3 is allowed to be incident on the amorphous silicon photosensitive member 1.

Preferably, the laser beam 3 impinges on the photosensitive member perpendicularly to the surface thereof at a position downstream of one or more discharging wires with respect to the peripheral movement direction of the photosensitive member 1.

From the standpoint of smaller size and lower cost, the diameter of the amorphous silicon photosensitive member 1 is preferably 10–70 mm, and it is preferable that the surface of the base plate of the photosensitive member is subjected to grating and/or blasting treatment to prevent interference which otherwise takes place at the surface of the base member.

In operation, the photosensitive member is charged by the charger 2 supplied with +7.0 KV, and substantially simultaneously therewith the laser beam is projected onto the photosensitive member through the slit 2-4 formed in the rear side of the shield for the charger 2. Generally, a diameter of the light spot formed on the photosensitive member by the laser beam is 40–200 microns, and the resolution is 200–500 dpi. In this embodiment, the laser spot diameter is 60 microns, and the resolution is 400 dpi. By the charging and the laser beam exposure, an electrostatic latent image is formed on the photosensitive member 1 and is developed by the developing device 4 into a toner image. The developing device 4 in this embodiment includes a toner conveying roller 4-2, a developing sleeve 4-1 and a regulating blade 4-3 for regulating a thickness of a layer of the toner on the developing sleeve 4-3. The toner image is transferred onto a transfer sheet conveyed from an unshown sheet feeding station. The transfer sheet onto which the toner image has been transferred is transported to an unshown image fixing device where the toner image is fixed into a permanent image.

On the other hand, the toner remaining on the photosensitive member 1 is removed by a cleaning blade 5-1 of the cleaning device 5. The photosensitive member having been deprived of the remaining toner is exposed to a discharge lamp 6, by which the light hysteresis is removed, so as to be prepared for the next image forming operation.

Figure 5:
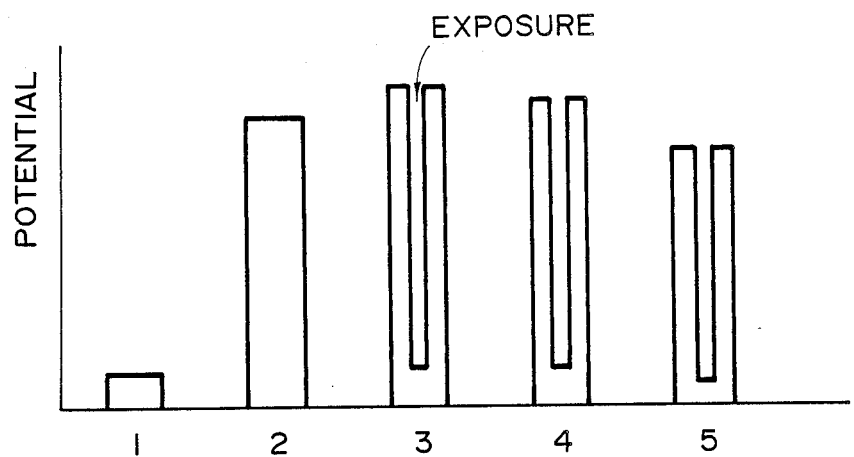
FIG. 5 is a graph illustrating a potential change in FIG. 1 embodiment.

Referring to FIG. 5, there is shown a change of the potential of the photosensitive member in FIG. 1 embodiment. The potential change is shown as the potentials at positions 1–5 of the photosensitive member shown in FIG. 1. As will be understood from FIG. 5, at the position 1, the surface potential starts to increase by the corona charging by the charger 2; at the position 2, it reaches a predetermined potential level (400–800 V); at the position 3, the potential in the area having been exposed to the laser beam decreases; and at the position 4, the exposed area is now hardly influenced by the charging because of the low charge retentivity, whereas the potential in the dark area has a slightly lowered potential because of the charging and the dark decay; and at the position 5, the photosensitive member is introduced into the developing process while the potential thereof is attenuating.

It should be noted that it is particularly effective when the photosensitive member 1 is of amorphous silicon that the imagewise exposure is performed at a position where the photosensitive member is subjected to charging action by the charger 2, because the charge retentivity of the amorphous silicon photosensitive member immediately after the image exposure is lower immediately than other photosensitive material.

Figure 4:
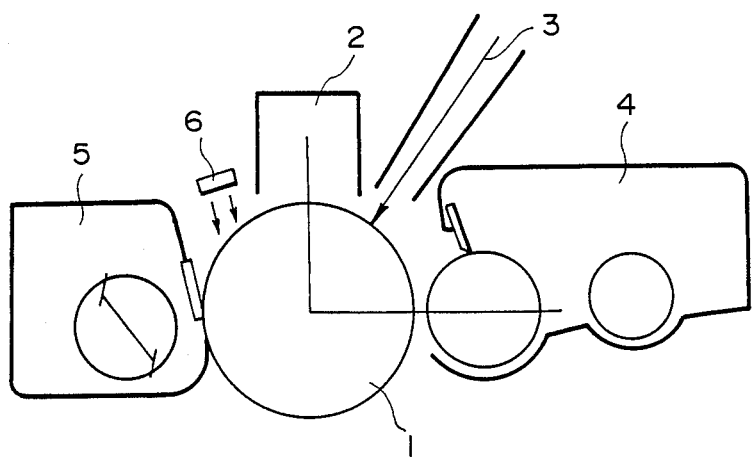
FIG. 4 is a sectional view of a conventional electrophotographic apparatus.

As described in the foregoing, the apparatus of this embodiment is such that the image exposure is performed in the charger. Accordingly, as compared with the conventional structure as shown in FIG. 4, the photosensitive member is exposed to image light when the potential of the photosensitive member is still high, so that the image contrast, that is, the potential difference between the dark portion and light portion, can be made higher. In addition, since the developing device can be disposed closer to the charger, the distance between the charging position and the developing position is reduced to compensate the defect of the amorphous silicon photosensitive member that the charge attenuation is large. Therefore, the advantages of the amorphous silicon photosensitive member (high image quality and longer service life) can be enjoyed efficiently.

Furthermore, the diameter of the photosensitive drum in this embodiment is small (10–70 mm), and therefore, the distance from the charger-exposure station to the developing station can be greatly reduced in combination with the above described structural features. It follows that a high development contrast can be provided despite the use of the amorphous silicon photosensitive member which exhibits a stronger dark decay.

Even if the size of the entire apparatus is the same, it is possible to increase the size of the shield, because the charging station and the exposure station are made common, making it possible to reduce the impedance with the result of increased charging power of the charger. Correspondingly, the size and cost of a high voltage transformer for the charger can be decreased. Additionally, when a larger size shield is used, the wire-shield gap in the charging device can be increased, whereby even if a higher voltage is applied to the charger, that is, if the charging current is increased, no abnormal discharging which might damage the photosensitive member does not take place.

Referring to FIG. 2, another embodiment of the present invention will be described. In this embodiment, the photosensitive member 1 is manufactured by coating an aluminum cylinder having a diameter of 30 mm with an amorphous silicon photosensitive layer having a thickness of 30 microns. It is rotated at a process speed of 90 mm/sec (peripheral speed of the photosensitive member). The photosensitive member 1 is charged to a positive polarity by the charger 2 supplied with a voltage of +7.0 KV, and substantially simultaneously, a laser beam scanningly deflected by the rotational mirror 11 is projected on the surface of the photosensitive member 1 through the space downstream of the charging wire 2-1 in the charging device 2 and upstream of the portion of the shield 2—2 at the developing device side with respect to the peripheral movement direction of the photosensitive member.

In this embodiment, the portion 2—2 of the shield is commonly a part of the developing device 4. More particularly, taking the advantage of the rigidity of the shield 2—2, the portion is made to function as a blade for regulating the thickness of toner layer formed on the developing sleeve. The developing device is of known type, as disclosed in U.S. Pat. No. 4,395,476, for example.

The photosensitive member 1 having been subjected to the charging and the image exposure is developed by the toner on the developing sleeve 4-1, and is introduced into the image transfer station. To the transfer station, a transfer sheet (not shown) is introduced along the sheet guide 7 at a speed equal to the process speed. The developed toner image is transferred onto the transfer sheet by the transfer charger 9 supplied with the voltage of +5 KV. The transfer sheet is transported by the conveying belt 8 to an unshown image fixing device where the toner image is fixed to a permanent image.

Figure 6:
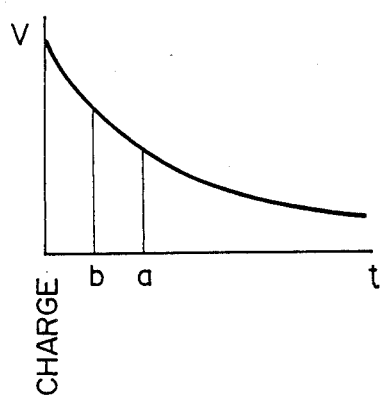
FIG. 6 is a graph illustrating dark decay exhibited by an amorphous silicon photosensitive member.

According to this embodiment, the angular space between the charger 2 and the developing sleeve 4-1 can be made 45 degrees. As will be understood from FIG. 4 illustrating a conventional apparatus, the corresponding angular distance is required to be 90 degrees. Thus, the angular distance can be reduced to half. Referring to FIG. 6, the dark decay of the amorphous silicon photosensitive member is shown. A reference "a" depicts a point of development operation in the conventional apparatus, whereas a reference "b" the point of development in the apparatus of this embodiment. As will be readily understood, the distance reduction between the charger 2 and the developing sleeve 4-1 in this embodiment makes it possible to perform the developing operation at the point b, whereby a sufficient development contrast can be provided.

A comparison was made in the effects between a copying machine NP 9030 available from Canon Kabushiki Kaisha, Japan and the apparatus according to this embodiment. The process speed of the NP 9030 machine was 180 m/sec, while that of this embodiment was 90 m/sec. Despite the very lower process speed, the same developing contrast were provided in both of the machine.

Thus, the decrease in the process speed resulting from reduction of the apparatus size can be compensated by the structure of the present invention without decreasing the development contrast or with a satisfactory contrast.

Experiments were further performed for the apparatus of FIG. 2 embodiment. It has been confirmed that by expanding the distance between the shielding plate portion 2—2 and the shielding plate portion 2-3 from 14 mm to 18 mm, the voltage and the current to the charger 2 can be increased from 7 KV to 8 KV, and 650 micro-amp. to 800 micro-amp., respectively, whereby the potential of the image at the developing position can be increased from 350 V to 380 V.

Referring to FIG. 3, a further embodiment of the present invention will be described, by which two color image can be produced. The image forming apparatus comprises a developing device 4-3 containing a red developer and another developing device 4—4 containing a black developer.

Another feature of this embodiment is that the upstream side of the shield of the charger 2 is commonly used as a plate for supporting a cleaning blade 5-1 of the cleaning device 5. This is also effective to reduce the size of the apparatus, so as to making it possible to incorporate two developing devices into the limited spaces.

While the invention has been described with reference to the structures disclosed herein, it is not confined to the details set forth and this application is intended to cover such modifications or changes as may come within the purposes of the improvements or the scope of the following claims.

What is claimed is:

1. An electrophotographic apparatus, comprising:
a photosensitive member including an amorphous silicon photosensitive layer;
charging means for uniformly charging said photosensitive member; and
projection means for applying a laser beam to said photosensitive member, said laser beam being incident on said photosenstive member through said charging means.

2. An apparatus according to claim 1, wherein said charging means includes a discharging wire and a shield enclosing the wire, wherein the laser beam travels through an opening formed in a rear side of the shield.

3. An apparatus according to claim 2, wherein the laser beam is incident on the photosensitive member at a position downstream of the discharging wire with respect to a movement direction of the photosensitive member.

4. An apparatus according to claim 1, wherein the laser beam is incident on said photosensitive member substantially perpendicularly thereto.

5. An apparatus according to claim 1, wherein said photosensitive member includes amorphous silicon material containing 10–40 atom % of hydrogen.

6. An apparatus according to claim 1, wherein said photosensitive member is in the form of a cylinder having a diameter 10–70 mm.

7. An apparatus according to claim 1, wherein the laser beam having a wavelength of 770–790 nm.

8. An electrophotographic apparatus, comprising:
a photosensitive member;
charging means for uniformly charging said photosensitive member;
projection means for applying a laser beam to said photosensitive member, said laser beam being incident on said photosensitive member through said charging means; and
developing means for developing a latent image formed on said photosensitive member, said developing means disposed in contact with said charging means.

9. An apparatus according to claim 8, wherein said charging means includes a discharging wire and a shield enclosing the wire, wherein the laser beam travels through an opening formed in a rear side of the shield.

10. An apparatus according to claim 9, wherein the laser beam is incident on the photosensitive member at a position downstream of the discharging wire with respect to a movement direction of the photosensitive member.

11. An apparatus according to claim 8, wherein the laser beam is incident on said photosensitive member substantially perpendicularly thereto.

12. An apparatus according to claim 8, wherein said photosensitive member includes amorphous silicon material containing 10–40 atom % of hydrogen.

13. An apparatus according to claim 12, wherein said photosensitive member is in the form of a cylinder having a diameter 10–70 mm.

14. An apparatus according to claim 12, wherein the laser beam having a wavelength of 770–790 nm.

15. An electrophotographic apparatus, comprising:
a photosensitive member;
charging means for uniformly charging said photosensitive member; and
image exposure means for exposing said photosensitive member to a light image, the light image being incident on said photosensitive member through said charging means;
wherein a part of said charging means is common to a further image forming means for image formation.

16. An apparatus according to claim 15, wherein said charging means includes a discharging wire and a shield enclosing the wire, wherein the laser beam travels through an opening formed in a rear side of the shield.

17. An apparatus according to claim 16, wherein said another process means is a developing means, and said part of said charging means is a part of a shield of said charging means.

18. An apparatus according to claim 16, wherein said another processing means is a cleaning means for cleaning said photosensitive member, and said part of said charging means is a part of a shield of said charging means.

19. An apparatus according to claim 16, wherein the laser beam is incident on the photosensitive member at a position downstream of the discharging wire with respect to a movement direction of the photosensitive member.

20. An apparatus according to claim 15, wherein said photosensitive member includes amorphous silicon material containing 10–40 atom % of hydrogen.

21. An apparatus according to claim 20, wherein said photosensitive member is in the form of a cylinder having a diameter 10–70 mm.

22. An apparatus according to claim 20, wherein the laser beam having a wavelength of 770–790 nm.

* * * * *

UNITED STATES PATENT AND TRADEMARK OFFICE
CERTIFICATE OF CORRECTION

PATENT NO. : 4,851,865
DATED : July 25, 1989
INVENTOR(S) : TOSHIYUKI EHARA, ET AL.

It is certified that error appears in the above-identified patent and that said Letters Patent is hereby corrected as shown below:

COLUMN 2

Line 13, "utilize" should read --utilizes--.
    Line 59, "semi-conductor laser 14" should read --semiconductor laser 14--.

COLUMN 4

Line 47, "no" should be deleted.

COLUMN 5

Line 42, "machine." should read --machines.--.
    Line 67, "making" should read --make--.

COLUMN 6

Line 36, "having" should read --has--.
    Line 68, "having" should read --has--.

COLUMN 7

Line 17, "another process means" should read --further image forming means--.

UNITED STATES PATENT AND TRADEMARK OFFICE
CERTIFICATE OF CORRECTION

PATENT NO. : 4,851,865
DATED : July 25, 1989
INVENTOR(S) : TOSHIYUKI EHARA, ET AL.

Page 2 of 2

It is certified that error appears in the above-identified patent and that said Letters Patent is hereby corrected as shown below:

COLUMN 8

Line 2, "another processing means" should read
--further image forming means--.
Line 18, "having" should read --has--.

Signed and Sealed this

Sixth Day of August, 1991

Attest:

HARRY F. MANBECK, JR.

Attesting Officer

Commissioner of Patents and Trademarks